(12) United States Patent
Arai et al.

(10) Patent No.: US 7,006,134 B1
(45) Date of Patent: Feb. 28, 2006

(54) PEN TYPE INPUT DEVICE WITH CAMERA

(75) Inventors: Toshifumi Arai, Hitachi (JP);
Kimiyoshi Machii, Hitachi (JP); Koyo Katsura, Hitachiota (JP); Hideyuki Watanabe, Atsugi (JP)

(73) Assignees: Hitachi, Ltd., Tokyo (JP); Hitachi Via Mechanics, LTD, Ebina (JP)

( * ) Notice: Subject to any disclaimer, the term of this patent is extended or adjusted under 35 U.S.C. 154(b) by 0 days.

(21) Appl. No.: 09/763,823

(22) PCT Filed: Aug. 12, 1999

(86) PCT No.: PCT/JP99/04391

§ 371 (c)(1),
(2), (4) Date: Feb. 27, 2001

(87) PCT Pub. No.: WO00/13141

PCT Pub. Date: Mar. 9, 2000

(30) Foreign Application Priority Data

Aug. 31, 1998 (JP) ................................. 10/244690

(51) Int. Cl.
*H04N 5/228* (2006.01)
(52) U.S. Cl. ............... 348/222.1; 382/314; 348/207.99
(58) Field of Classification Search ............... 382/314, 382/313, 296, 297, 293, 188; 348/207.99, 348/222.1

See application file for complete search history.

(56) References Cited

U.S. PATENT DOCUMENTS 5,774,602 A * 6/1998 Taguchi et al. ............. 382/314
5,850,058 A * 12/1998 Tano et al. ............... 178/18.01
6,839,453 B1 * 1/2005 McWilliam et al. ........ 382/119

OTHER PUBLICATIONS

Toshifumi et al., "PaperLink: A technique for Hyperlinking from Real Paper to Electronic Content.", Human Factors in Computing Systems, ACM, 1997, p. 327-334.*

* cited by examiner

*Primary Examiner*—David L. Ometz
*Assistant Examiner*—Heather R. Long
(74) *Attorney, Agent, or Firm*—Antonelli, Terry, Stout and Kraus, LLP.

(57) ABSTRACT

A pen type input device with a camera has improved usability as a result in improved construction of the device. The pen type input device with the camera is adapted for use in detecting both of a horizontally elongated object and a vertically elongated object. On the other hand, means for pointing to the object and the process content simultaneously, and further means for detecting the fact that the user is pointing to the object in an erroneous manner and for teaching a correct manner of pointing to the object depending thereon are provided.

5 Claims, 17 Drawing Sheets

PATTERN 2

VPEN-TIP 1401
1402
TIP
401

AS SHOWN IN THE FOLLOWING, PLEASE POINT THE LOWER-RIGHT SIDE OF THE OBJECT.
* PLEASE DO NOT OVERLAP THE PENPOINT OVER THE OBJECT.

POINT-TUTORIAL-DIALOG     POINT-PREF-BTN

PLEASE POINT A STANDARD PATTERN ON THE POINTING CORRECTION SHEET BY USING THE VIDEO PEN.

| OBJECT MINIMUM DIISTANCE | 18BITS | 2301 |
| STANDARD ANGLE | 32DEG. | 2302 |

PEN TYPE INPUT DEVICE WITH CAMERA

TECHNICAL FIELD

The present invention relates to a pen type input device provided with a camera that has an improved usability. More particularly, the invention relates to a pen type input device for use as a user interface, permitting a user to easily call out a function of an information processing apparatus. Namely, the invention relates to a handy image input device to be used with an information processing apparatus.

BACKGROUND OF THE INVENTION

An example of a pen type input device with a camera, called a MEMO-PEN, is disclosed in ACM PRESS, HUMAN FACTORS IN COMPUTING SYSTEMS, CHI 95 Conference Companion, p256–P257. The MEMO-PEN incorporates a compact camera embedded in a penholder to continuously pick-up an image in the vicinity of a penpoint across the penpoint to record handwriting. The area in which data can be picked-up by the camera of the MEMO-PEN is limited to a quite narrow region required for making a judgment as to the direction of the handwriting.

In the MEMO-PEN, since the camera is embedded in the penholder, the visual field of the camera is obstructed by the hand of the user, unless the optical system is arranged at a position inclined toward the penpoint from a portion of the penholder to be gripped by the hand of the user. Therefore, even if an optical system having wide visual field is used, there is a limitation distance at which the optical system can be spaced from an object to be viewed (paper). Therefore, the wide visual field of the camera cannot be used efficiently. On the other hand, in the condition in which the user naturally holds the pen, the penholder is usually inclined significantly relative to an up-right position. Therefore, an image to be picked up by the camera is a cross shot of the image.

A function of the MEMO-PEN is to store the handwriting of the user written by the MEMO-PEN so as to allow the handwriting to be reproduced with the aid of an information processing apparatus or to recognize the written characters. Namely, during collection of the handwriting data, in otherwords, while the user uses the MEMO-PEN, a user interface, which is provided to call out the function of the information processing apparatus, using a pen-type input device with a camera, would never be executed. Accordingly, the kind of process to be applied for processing the object (handwriting) during input of data is not designated by the pen. Furthermore, in case of the MEMO-PEN, since the pen pointer and the position of the handwriting constantly match each other, it is not necessary to adjust the positional relationship between the input object (handwriting) and the penpoint.

As an example of a system relating to a pen-type input device with a camera, a system called PaperLink is disclosed in ACM PRESS, HUMAN-FACTORS IN COMPUTING SYSTEMS, CHI 97 CONFERENCE PROCEEDINGS, P327–p334. In the PaperLink system, the device with which the user inputs a process object is a pen-type input device mounting a compact camera. The compact camera is located at a position looking down on the object (paper surface) from right above under the condition in which the user naturally holds the pen. The visual field of the camera can be set so that the camera views an area of several cm square around the penpoint. The picked-up image around the penpoint is input to the information processing apparatus to execute various processes depending upon the data content. If the input object is known, a predetermined process depending thereupon is executed. For example, a predetermined file is opened to the user or execution of a predetermined program is initiated. On the other hand, if the object being input is not known, it is temporarily stored for use as an argument to a command to be executed later.

A problem to be solved by the present invention is that the usability of the device for inputting an image of an object is degraded by mounting the compact camera on the pen-type device. In the MEMO-PEN, since the camera including the optical system is built in the penholder, there is another problem in that it is difficult to provide a wide visual field for the camera.

Concerning the foregoing PaperLink system, since the axis of the pen and the center axis of the camera are arranged on the same plane, a longitudinally elongated pattern cannot be observed by natural operation. Furthermore, in the input device of the PaperLink system, since there is only one means for pointing to the object, it is not possible to designate the process object and kind of process simultaneously. Also, if the user designates an object and the penpoint has a construction such that the camera looks down the penpoint from above, as in the PaperLink system, the designated object is hidden by the penpoint, thereby to make it impossible to produce an accurate input.

On the other hand, since the penpoint and the designated object cannot be overlapped, as set forth above. It becomes necessary to limit the choice of the user in the method for designating the object. Namely, in the pen-type input device with a camera, the relationship between the position of the designated object and the position of the penpoint is variable depending upon the choice of designation method of the user. For example, when the user designates a laterally elongated object, some users may point to the center portion, and another user may point to a lower right position. On the other hand, the tilt angle of the pen upon pointing to the object may be different with different users.

SUMMARY OF THE INVENTION

An object of the present invention is to provide a pen type input device with a camera which can improve the usability of the input device.

In order to accomplish the foregoing object, the present invention is provided with the following features.

In accordance with the present invention, upon installing the camera on the pen, the center axis of the camera is arranged to be offset from the center of the pen. When a user points to a vertically elongated object from the right side, the camera is arranged at the left side of the penholder. In this way, the penholder will never be placed between the camera and the object so as to produce an obstruction. Conversely, when a user points to a vertically elongated object from the left side, the camera is arranged at the right side of the penholder. On the other hand, in place of fixing the camera to be offset toward the left or the right, a construction may be adopted to offset the camera toward the left or right by pivoting the camera within a range from 0° to 90° to either side.

On the other hand, a compact camera, or a portion of the pen on which the camera is installed, is provided with a process designating device for designating the kind of process to be employed for the data obtained from the object. The process designating device may be a mechanism for switching the color of a penpoint in a multi-color ball point pen, for example. By preliminarily setting a predetermined process using the process designating device, the process can be activated simultaneously while pointing to the process object. The process designating device may be a device for varying the shape or color of the penpoint. Since the penpoint is used for pointing to the object, the user may watch the shape or color of the penpoint corresponding to the kind of process while capturing the object in a visual field.

On the other hand, a pointing manner teaching means for teaching the correct manner of pointing to the user is provided, and incorrect pointing detection means for detecting an incorrect manner of pointing of the object by the user is provided. The incorrect pointing detection means may make a judgment as to the incorrect manner of pointing of the object by the user when a region of the detected object and a region where the penpoint appears overlap, for example. On the other hand, when extraction of the object has failed continuously for a predetermined number of times, judgment may be made that the manner of pointing the object by the user is not correct.

Furthermore, in order to give the user a choice in pointing to the object using the pen type input device with a camera, pointing error correcting means may be provided. The pointing error correcting means is different from the parallax error means provided in a typical tablet display, and is means for registering a choice or preference of the user concerning the positional relationship between the pen type input device with a camera and the object pointed to by the same.

BEST MODE FOR IMPLEMENTING THE INVENTION

The following abbreviations are used throughout the figures to more easily identify various features of the present invention which are discussed in detail below.

Figure 1:
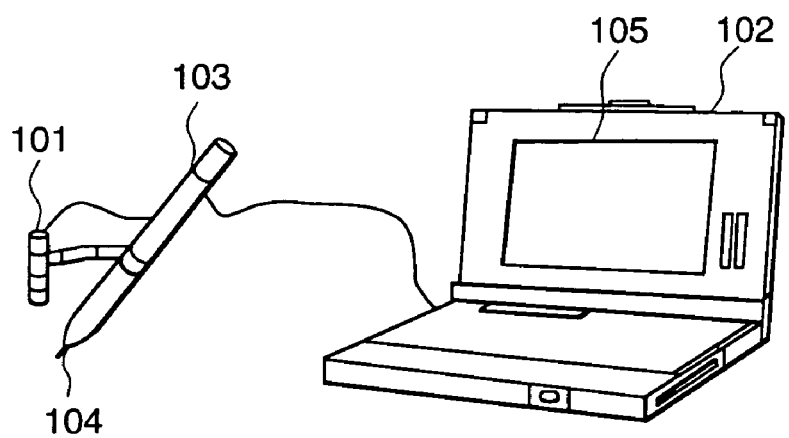
FIG. 1 is a diagram of an overall system employing a video pen according to the present invention.

VPEN-TIP: Penpoint of video pen
VPEN-FRM: Penholder of video pen
VPEN: Video pen
TIP-SW: Switch embedded in penpoint of video pen
POINT-PREF-BTN: Button to activate function for the preference setting for user-favorite manner of pointing
STD-PTN: Standard pattern to be used in the preference setting for user-favorite manner of pointing
MIN-DIST: Minimum distance between penpoint of video pen and object
PTN-DIC: Pattern dictionary in which patterns to be recognized are registered
PROC-TAB: Process table
PROC-COUNT: Process item number region
PROC-TAB-ELM: Process designation item
TIP-FIELD: State region for holding penpoint number
PROC-FIELD: Process designation region
ACT-COUNT: Operation item number region
ACT-TAB-ELM: Operation designation item
PTN-ID2: Object pattern identification region
ACT-FIELD: Operation region
ACT-TAB: Operation table
IP-AREA: Process step displaying region
MSG-AREA: Message displaying region
PB-AREA: Pattern buffer region FIG. 1 shows one example of a hardware construction for implementing the present invention. A user may input data to an information processing apparatus 102 to execute a command of the information processing apparatus 102 employing a pen type input device on which a compact camera 101 is mounted.

Such a pen type input device with a camera will be referred to hereinafter as a video pen 103. When a user points to something using the video pen 103 a switch mounted at the tip end of the video pen 103, namely a penpoint switch 104, is turned ON. The information processing apparatus 102 is responsive to the turning ON of the penpoint switch 104 to take in the image from the camera 101 of the video pen 103 so as to execute various processes depending upon the content of the received data. For example, a line in a document is extracted from the image, subject to character recognition, and the data is transferred to a dictionary program. Then, the result is displayed on a display 105.

Figure 2:
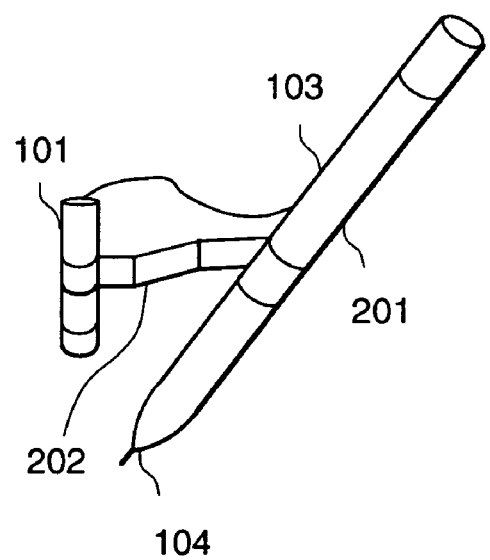
FIG. 2 is a diagram showing details of the video pen.

FIG. 2 shows one example of the structure of the video pen 103. A penholder 201 portion is gripped by the user. A penpoint switch 104 is mounted on the tip end of the penholder 201. The tip end of the penpoint switch 104 has bar-shaped configuration. When the user points to an object using the video pen 103, the bar is pushed into the penholder 201 to turn ON an electrical contact. On the penholder 201, the camera 101 is mounted so as to pick-up an image of the area around the tip end of the video pen 103. The camera is mounted on the penholder 201 by a camera holding member 202. The camera 101 is mounted at a position where it is able to vertically look down on a portion around the tip end as much as possible when the user holds the video pen in a typical manner of holding a pen. As the camera 101, a commercially available compact video camera may be used. The compact video camera employing a ¼ inch image pick-up element has a circular cross-section less than or equal to 1 cm in diameter and a length of about several cm. On the other hand, the penholder 201 has a circular bar-shaped cross-section about 1 cm in diameter similar to a typical-pen.

Figure 3:
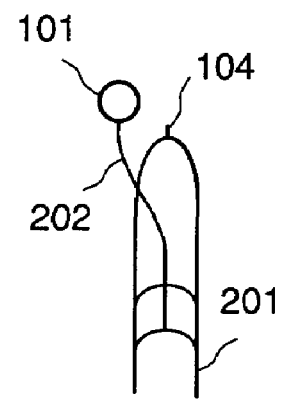
FIG. 3 is a diagram showing the video pen as viewed from above.

FIG. 3 shows a view looking down from the right above with the video pen 103 oriented in the same condition as that in which the user holds the same. In this case, since the camera 101 is arranged in a vertical direction, it can be seen in circular form as in cross-section. Here, the point to notice is that the penholder 201 and the camera 101 are not arranged on the same plane. The camera 101 is arranged to be offset toward the upper left direction from the plane in which the penholder 201 falls. When pointing to a vertical line in a document using the video pen 103, this orientation will prevent the objective line from being hidden by the penholder 201.

Figure 4:
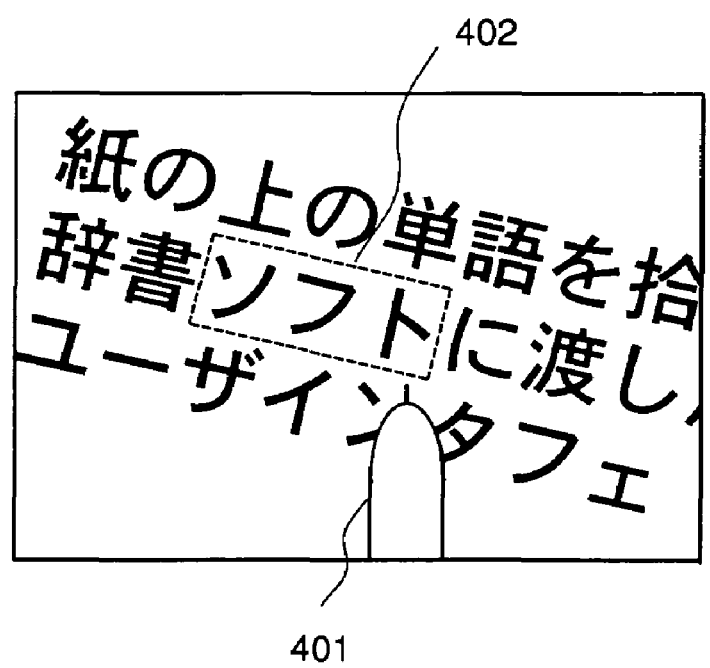
FIG. 4 is a diagram showing one example of an image picked-up in a horizontal line of a document by means of a video pen.

FIG. 4 shows an example of the image of a horizontal line in a document picked up by the video pen 103 shown in FIG. 2. A penpoint 401 of the video pen 103 appears at a position slightly offset in a lower right direction from the center of the image. On the other hand, at a center portion, the objective pattern 402 pointed to by the user is picked up.

Figure 5:
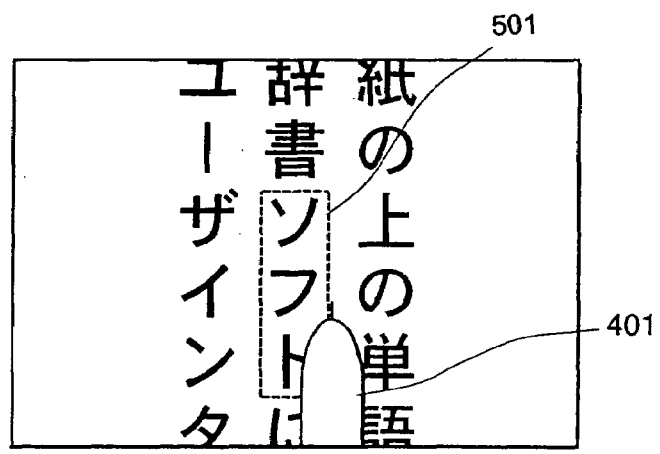
FIG. 5 is a diagram showing one example of an image picked-up in a vertical line of a document by means of a video pen.

FIG. 5 shows an example of the image of a vertical line in a document picked up by the video pen 103 shown in FIG. 2, similarly. The penpoint 401 of the video pen 103 appears at the same position as that in FIG. 4. This is natural since the positional relationship of the camera 101 and the penholder 201 is fixed. In FIG. 5, the objective pattern 501 appears to extend vertically at the center of the image. At this time, since the camera 101 is arranged so as to be offset toward the left from the penholder 201, the penholder 201 never obstructs the camera so as to hide the objective pattern 501 in the vertical line of the writing document.

Figure 6:
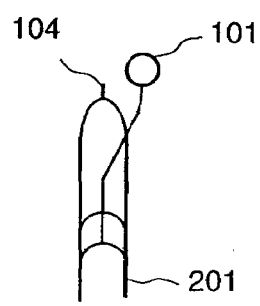
FIG. 6 is a diagram showing a construction of the video pen for left-handed use as viewed from above.

FIG. 6 shows a method for installing the camera upon forming the video pen 103 for left handed use similar to FIG. 3. In FIG. 3, the video pen 103 is arranged for right handed operation and is assumed to point to a vertically elongated object which held by the right hand from the right side. In order to point the vertically elongated object using the by left hand from the left side, the camera 101 may be installed so as to be offset toward the right from the penholder 201. In this way, even when the vertically elongated object is pointed to from the left side by the video pen 103, the object will never be hidden by the penholder 201.

Figure 7:
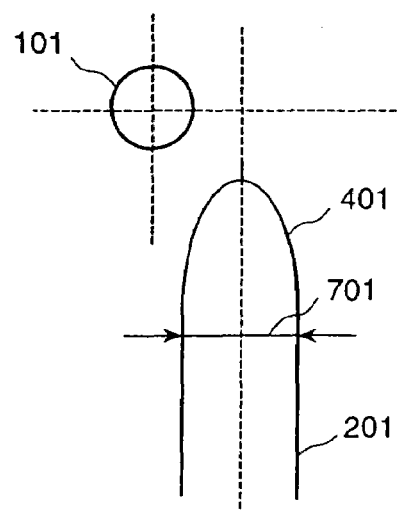
FIG. 7 is a diagram illustrating the quantative shifting amount of the camera of the video pen.
Figure 8:
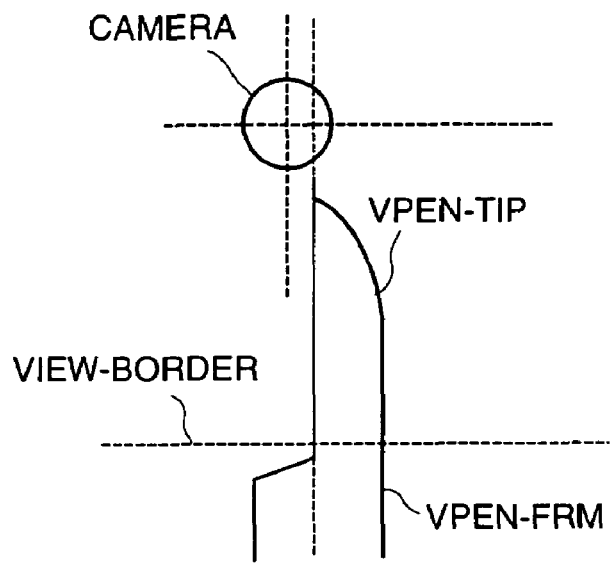
FIG. 8 is a diagram showing an example of the shape of a penpoint requiring an extremely small shifting amount of the camera of the video pen.

FIG. 7 shows how much offset from the center plane of the penholder 201 is required for the camera 101. In order for the penholder 201 to not hide the vertically elongated object, the camera 101 has to be offset with a magnitude greater than or equal to half of the thickness 701 of the penholder 201 at the portion picked up by the camera. However, for certain shapes of the penpoint 401, a smaller offset magnitude will be sufficient. For example, when the portion of the penpoint 401 appearing in a range of the image of the camera has the shape as illustrated in FIG. 8, the offset magnitude can be greater than or equal to 0. Accordingly, the offset magnitude of the camera may be adjusted so that the offset magnitude is greater than the width of the portion of the penholder 201 appearing in a range of the image of the camera, inclined toward the object to be pointed to relative to the center line of the penholder 201.

Figure 9:
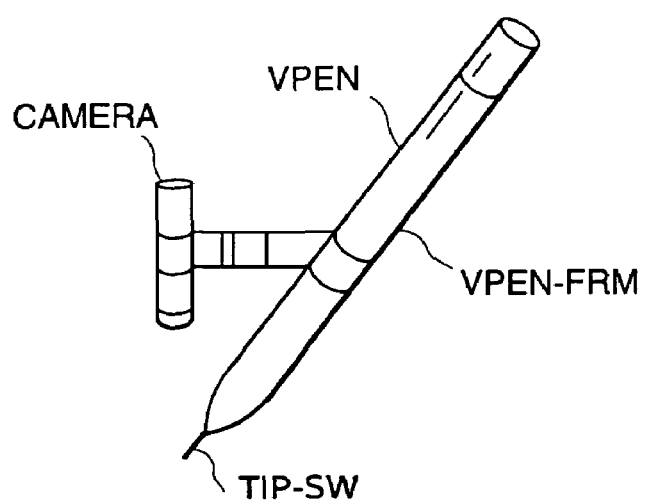
FIG. 9 is a diagram showing a construction of the video pen.

FIG. 9 shows another example of the structure of the video pen 103. The body of the pen holder 201 is the same as that shown in FIG. 2, but is different in the mounting of the camera 101.

Figure 10:
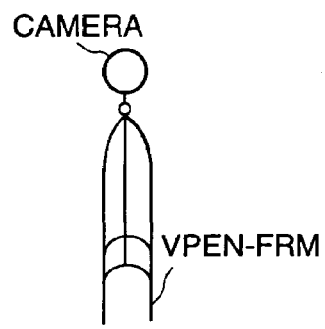
FIG. 10 is a diagram showing a video pen as viewed from above (setting for horizontal writing)

FIG. 10 shows a view looking down from the right with the vide open 103 oriented as shown in FIG. 9 in the same condition as that in which the user holds the same. In this case, as opposed to the case of FIG. 3, the camera 101 is arranged on the same plane with the penholder 201. Accordingly, there will be no problem in pointing to the objection a horizontal line. However, upon pointing to a vertically elongated object, such as a vertical line of a written document, the pen-holder interferes with the camera.

Figure 11:
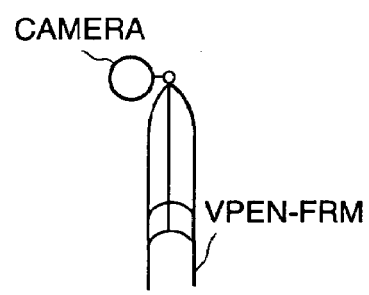
FIG. 11 is a diagram showing a video pen as viewed from above (setting for vertical writing)

For solving this problem, in the video pen 103 shown in FIG. 9, camera 101 can be shifted toward the left with rotation in a range of 90° with respect to the penholder 201. FIG. 11 shows a condition of locking down the camera 101 at an offset position toward the left with rotation of the camera. The camera holding member 202 is bent at an intermediate position, and the camera is rotated over a range of 90° to swing out toward the left. In this condition, upon pointing to a vertically elongated object, the penholder 201 will never hide the object.

Figure 12:
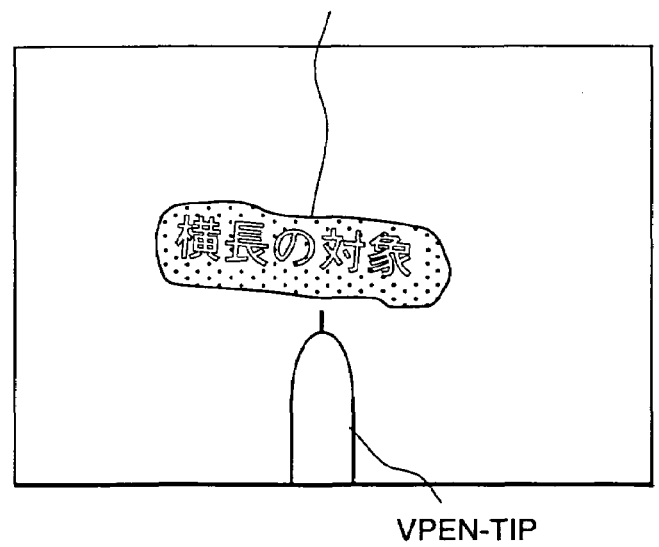
FIG. 12 is a diagram showing one example of an image picked up of a horizontally elongated object in a setting for horizontal writing.

FIG. 12 shows one example of the image of a horizontally elongated object picked up by the camera under the condition shown in FIG. 10. There is no significant difference with the case of FIG. 4 except for the position of the penpoint 401 being slightly below the center of the image. Namely, upon pointing to the horizontally elongated object, it can be said that there is little difference in the pointing of the video pen 103 shown in FIG. 2 and the video pen 103 of FIG. 9 when pointing to a horizontally elongated object.

Figure 13:
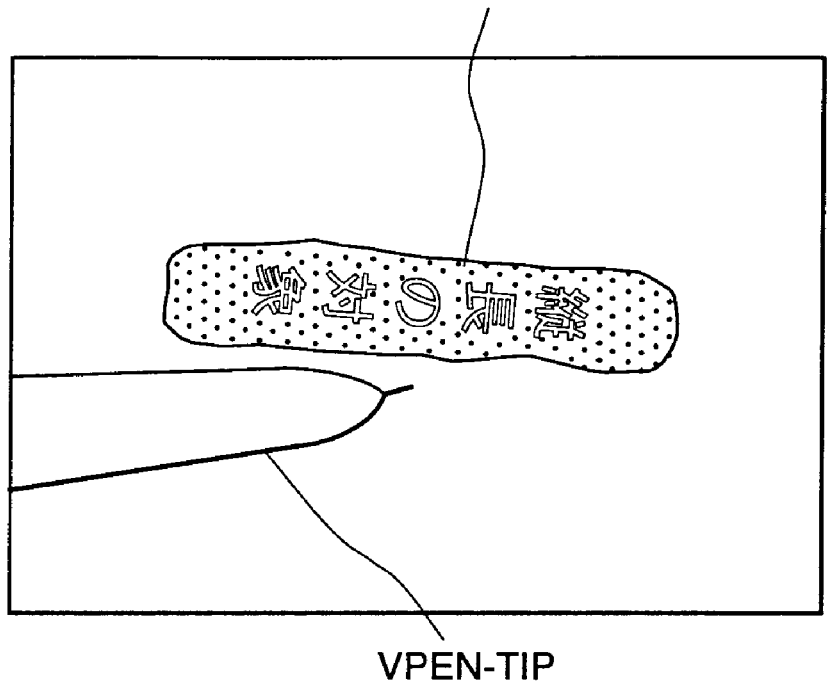
FIG. 13 is a diagram showing one example of an image picked up of a vertically elongated object in a setting for vertical writing.
Figure 14:
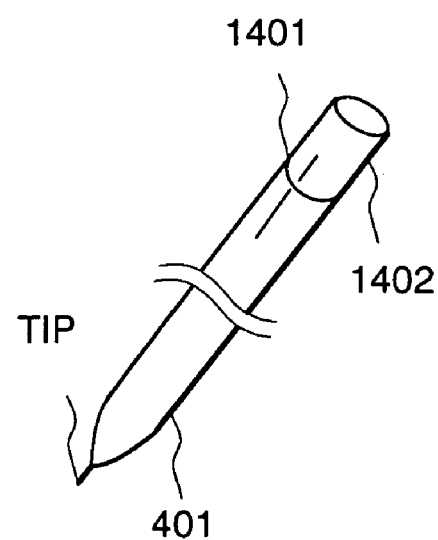
FIG. 14 is a diagram showing an overall construction of a process designating device.

On the other hand, FIG. 13 shows one example of the image of a vertically elongated object picked up by the camera under the condition shown in FIG. 11. In this case, since the camera 101 is rotated over by 90°, the penpoint 401 appears at below the left side of the center of the image. On the other hand, the vertically elongated object appears as elongated in a horizontal direction of the image. The image picked-up by a commercially available video camera is typically elongated in the horizontal direction. In the construction of the video pen 103 shown in FIG. 9, even upon pointing to a vertically elongated object, the image of the image pick-up element can be used effectively.

Namely, upon pointing to a vertically elongated object using the video pen 103 shown in FIG. 2, only the object falls within the shorter sides of the image, as shown in FIG. 4. However, in the case of the video pen 103 shown in FIG. 9, it becomes possible to input the object which falls within the longer sides of the image, as shown in FIG. 13.

The video pen 103 shown in FIG. 9 encounters a problem in that, upon pointing to a vertically elongated object, the user has to change the arrangement of the camera 101. Accordingly, it is desirable to employ the construction shown in FIG. 2 when the resolution and image pick-up range of the camera is sufficiently large, and to employ the construction shown in FIG. 9 otherwise.

In the construction of the video pen 103 shown in FIG. 9, so that the information processing apparatus 102 may make judgment as to whether the object is horizontally elongated or vertically elongated, it becomes necessary to read where the camera 101 of the video pen 103 is set. This may be done by electrically the condition of the camera holding member 202 or by making a judgment from the picked-up image. Namely, by checking where the penpoint 401 appears in the image, the position of the camera 101 can be identified. If the penpoint 402 appears at a central lower side of the image, as shown in FIG. 12, this indicates a case where a horizontally elongated object is being picked up. On the other hand, when the penpoint 401 appears at the lower left side of the image, as shown in FIG. 13, this indicates a case where the vertically elongated object is pointed to from the right side. Also, when the penpoint 401 appears at a lower right side of the image, this indicates a case where the vertically elongated object is being pointed to from the left side.

In the portion of the penholder 201 of the video pen 103, a process designating device 1401 for designating the kind of process to be executed for the data obtained from the object is provided. The process designating device 1401 is a mechanism for switching the pen color in a multi-color ball pointed pen, for example. The user selects a color corresponding to the process to be activated by rotating a rotary portion 1402 at the upper end of the penholder 201.

By preliminarily setting a predetermined process using the process designating device 1401, the user may activate the process simultaneously with designation of the object to be processed. The process designation device 1401 may also vary the shape or color of the penpoint 401. Since the penpoint 401 is the portion used to point to the object, the user may watch the shape or color of the penpoint 401 corresponding to the kind of process while watching the object.

For reading the condition of the process designating device namely, which one of the pens is selected, a construction employing electrical contacts may be considered, for example. In such a case, upon turning ON of the penpoint switch 401, the condition of the processing device 1401 may be read out.

On the other hand, since the penpoint 401 falls within the visual field of the camera 101, it may be possible to identify the kind of process by image processing without using particular electric signal upon processing the image from the camera 101. Since the positional relationship between the penpoint 401 and the camera is known, the position of the penpoint 401, particularly the pen in the input image from the camera 101, can be calculated preliminarily. During the image processing, by checking the color present at the current position, the kind of the currently selected process can be easily discriminated.

In a user interface method according to the present invention, the user inputs an image of the object to the information processing apparatus 102 using the video pen 103. Accordingly, in order to accurately input an image of the object, it becomes necessary to acquire the correct object designation method using the video pen 103. Namely, the penpoint 401 of the video pen 103 should not hide the object, and the penpoint 401 and the object should not be too distant.

Figure 15:
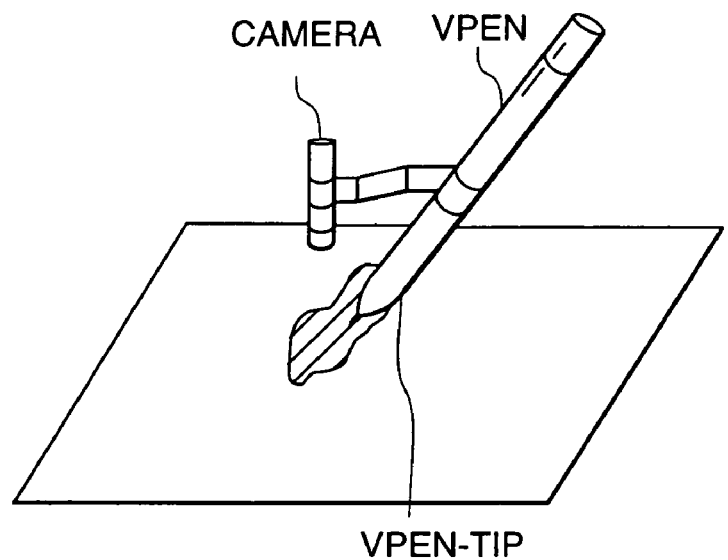
FIG. 15 is a diagram showing one example of the case when an erroneous object is designated by the video pen.

The user, when using the video pen 103 for the first time, tends to overlap the penpoint 401 on the object, as shown in FIG. 15. This condition will not create a problem when the object to be pointed to is a displayed image of the system, such as a pen input computer, and has means to input coordinates on the display of the image pointed to by the pen. However, in the user interface method, as employed by the present invention, when the object is extracted from the image by picking up a portion around the penpoint 401, it will be a significant problem if the object is hidden by the penpoint 401.

As set forth above, in the case where the user places the penpoint 401 so that it overlaps with the object, it becomes necessary to provide a means for teaching the manner of pointing by detecting the occurrence of overlapping orientation of the penpoint on the object and teaching the correct manner of pointing.

Figure 16:
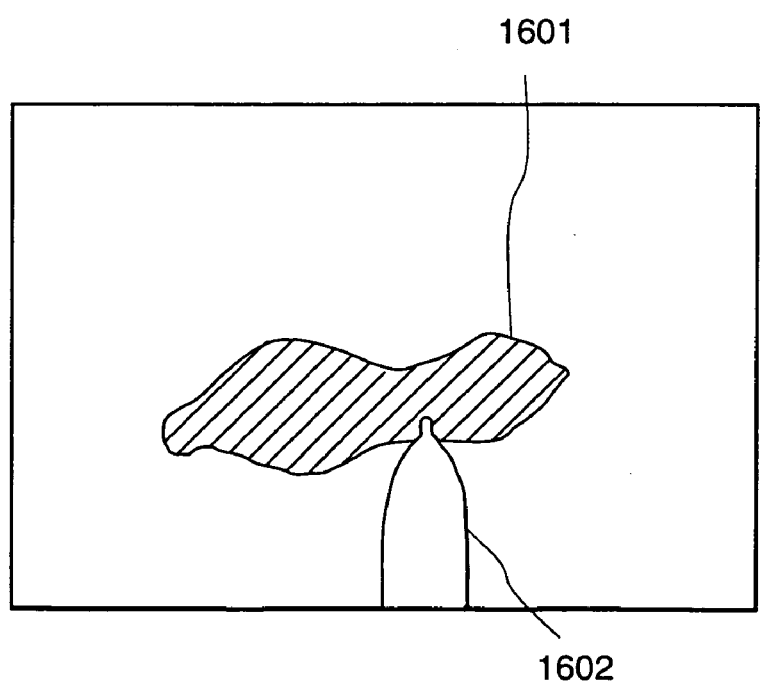
FIG. 16 is a diagram showing an example of the detecting of overlapping of the penpoint and the object after extraction of the object.

Overlapping of the penpoint 401 on the object can be detected in the following manner. Namely, a region extracted as an object and a region where the penpoint 401 should appear ate compared determine whether the user has placed the penpoint so that it overlaps on the object, which is indicated if both have an overlapping portion. FIG. 16 shows one example where a region 1601 extracted as an object and the projection 1602 of the penpoint 401 overlap. The region where the penpoint 401 is located can be derived preliminarily, since the positional relationship between the penholder 201 and the camera is known. Upon detection that the user overlaps the penpoint 401 on the object, a teaching display which shows the user the correct manner of pointing to the object is displayed. It is also possible to produce the teaching display indicating the manner of pointing when the failure of extraction of the object in series a predetermined number of times, for example, three times.

Figure 17:
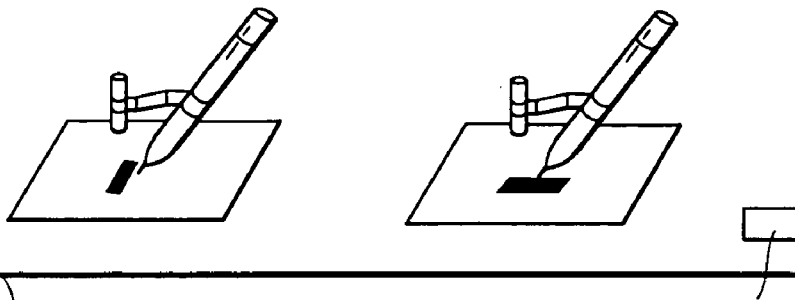
FIG. 17 is a diagram showing one example of a screen for teaching a manner of pointing.

FIG. 17 shows one example of a teaching image to be displayed on a display 105 of the information processing apparatus 102. The pointing manner teaching image teaches the user to point several mm toward the lower side in the case of a horizontally elongated object and several mm horizontally toward the right side in the case of a vertically elongated object.

On the other hand, in the pointing manner teaching image, a pointing correction button 1701 is provided for calling the pointing correcting means, which will be discussed later.

When the user points to the object the video pen 103, the manner of pointing is different for each individual. For example, upon pointing to a horizontally elongated object, some users may point to the lower side of the center of the object, and another user may point to the lower right side of the object. Also, the tilt angle of the pen relative to the object may be different for each user. For example, upon pointing to a horizontally elongated object, some users may point to the object from the right below, and another user may point to the object from the lower right. Furthermore, the distance from the object to be pointed to and the penpoint 401 may be different for each user. For example, upon pointing to a horizontally elongated object, some user may point immediately to the lower side of the object and another user may point to a position about 1 cm below the object.

As set forth above, the different manner of pointing to the object, depending on the user, has to be reflected as a parameter upon extraction of the object. Also, in some cases, it may become necessary to adjust the positional relationship between the penholder 201 of the video pen 103 and the camera 101. Thus, in the user interface method according to the present invention, there is provided means for preliminarily registering a difference in pointing by the user (hereby referred to as "pointing"). This means will be referred to as a pointing correction means.

Figure 18:
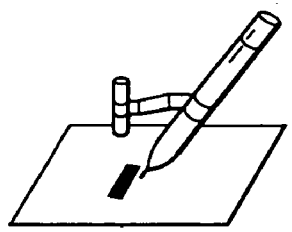
FIG. 18 is a diagram showing one example of a message displaying pointing correction means.
Figure 19:
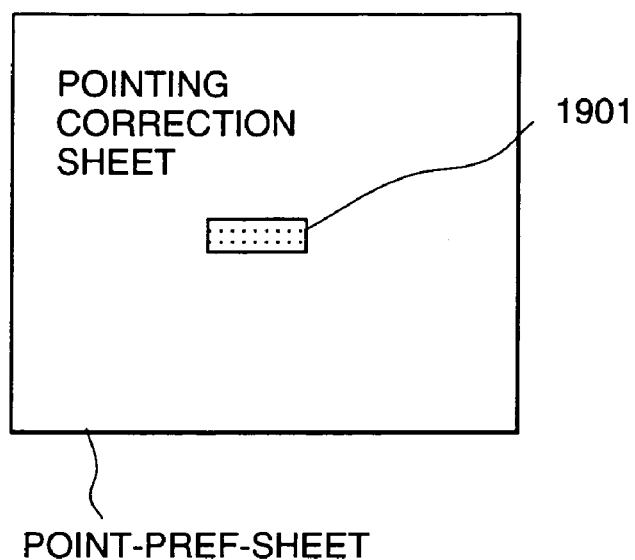
FIG. 19 is a diagram showing one example of a sheet used for pointing correction.

Upon activating the user interface method according to the present invention, at first, the pointing correction means is called upon by depression of the pointing correction button 1701 as set forth above. The user may register his choice by use of the pointing correction means in the following manner, for example. When the user activates the pointing correction means, a message as shown in FIG. 18 is displayed on the display 105. According to the message, the user points to the object on a pointing correction sheet shown in FIG. 19 using of the video pen 103. The pointing correction sheet is a simple sheet of paper on which a horizontally elongated object is printed. The object, shape and the size of the standard pattern 1901 are preliminarily registered in the information processing apparatus 102.

Figure 20:
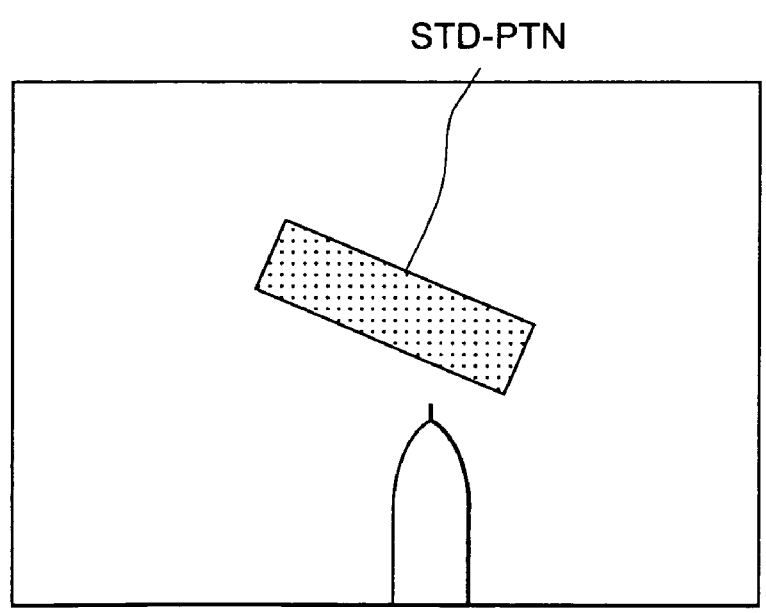
FIG. 20 is a diagram showing one example of an image picked-up of a standard pattern for pointing correction.

When the user points to the standard pattern 1901 using the video pen 103, the image shown in FIG. 20 is obtained as the input image. The information processing apparatus 102 will readout information indicating what portion of the object the user has pointed to with the penpoint 401, and at what angle the penholder 201 is tilted during pointing by performing image processing for the image. The choice of the user relating to designation of the object thus read out is used as a reference value upon extraction of the object to be processed from the input image by the information processing apparatus 102.

In the illustrated embodiment, the distance between the object and the position pointed to by the user (object minimum distance) and the tilting (standard tilting) angle of the video pen 103 are registered as the user's choice. The manner of deriving this information will be discussed in detail later together with a discussion of the object extracting portion of the information processing apparatus 102.

Figure 21:
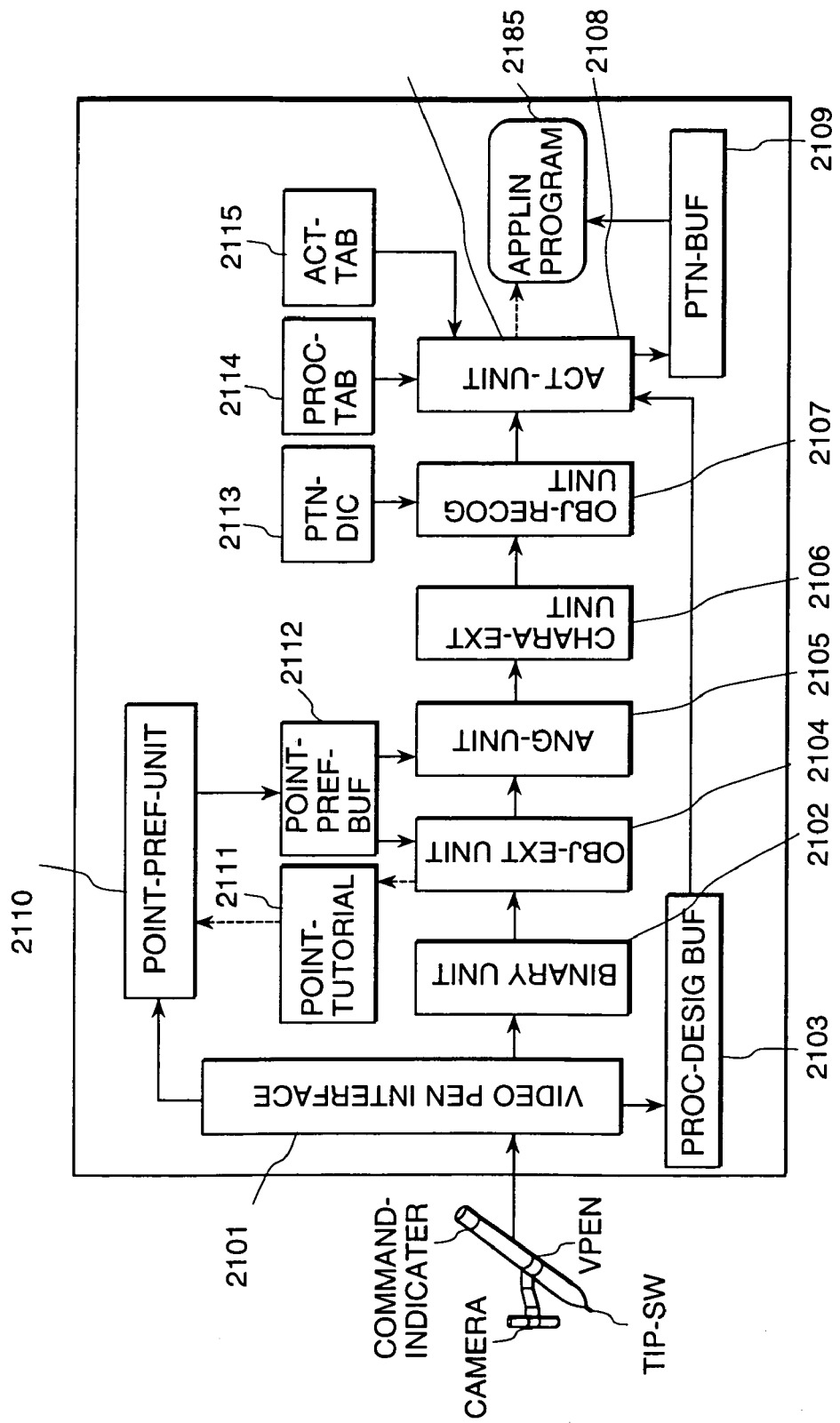
FIG. 21 is a block diagram showing the internal construction of an image processing apparatus.

FIG. 21 shows one example of the overall construction for implementing the present invention and illustrates the particular internal construction of the information processing apparatus 102. Hereinafter, the operation of the respective components will be discussed.

(1) Video Pen Interface 2101

When the user points to the object to be input by the video pen 103, the penpoint switch 104 mounted at the tip end of the video pen 103 is turned ON. The video pen interface 2101, up detecting the turning ON of the penpoint switch 104, will take in one frame of the image from the camera 101 and transfer the image frame to a binarizing portion 2102. The image transferred to the binarizing portion 2102 is a color image having 320 dots in the horizontal direction and 240 dots in the vertical direction, and it will be converted to a color signal of 24 bits per one pixel.

On the other hand, the video pen interface 2101 reads in the condition of the process designating device 1401 attached to the video pen 103 so as to write data in the process designating buffer 2103. Data written in the process designating buffer 2103 is the number of the pen selected by the process designating device 1401, for example. However, when the number is 0, it represents the condition that no process is designated.

(2) Binarizing Portion 2102

Figure 22:
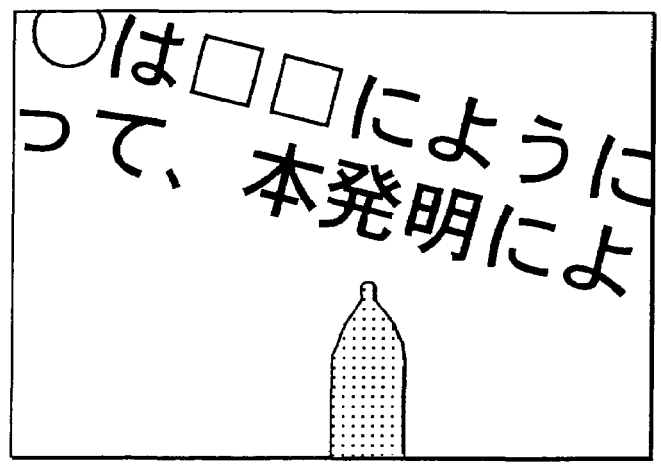
FIG. 22 is a diagram showing a horizontally elongated object as one example of a binary image.

The binarizing portion 2102 converts the input image into a binary image signal and transfers the resultant binary image signal to an object extracting portion 2104. FIG. 22 shows one example of the image represented by the binarized image signal transferred to the object extracting portion 2104.

It should be noted that, in the construction where the condition of the process designating device 1401 cannot be read out from the electrical contact, in advance of binarization of the input image, the color of the region where the pen appears is checked to determined what color pen is selected so as to write the number of the pen selected in the process designation buffer 2103.

(3) Object Extracting Portion 2104

The object extracting portion 2104 is a unit for extracting the object data from the binarized image signal transferred from the binarized portion 2102. In the transferred binarized image signal, various matters other than the object appear. For example, the penpoint 401 may appear and matters written near the object may also appear. The function of the object extracting portion 2104 is to extract only the object data from the transferred binarized image signal. The image signal is then transferred to a tilt correcting portion 2105.

Figure 23:
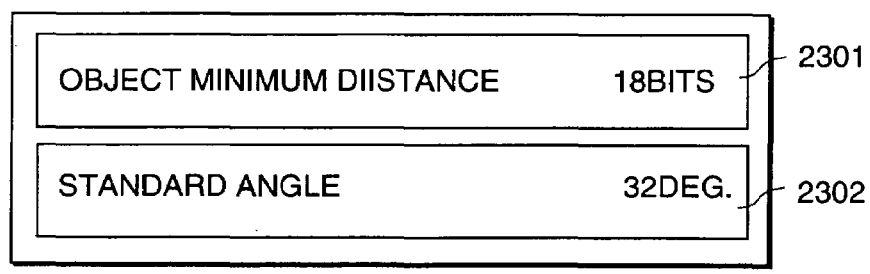
FIG. 23 is a diagram showing one example of a value for pointing correction.
Figure 24:
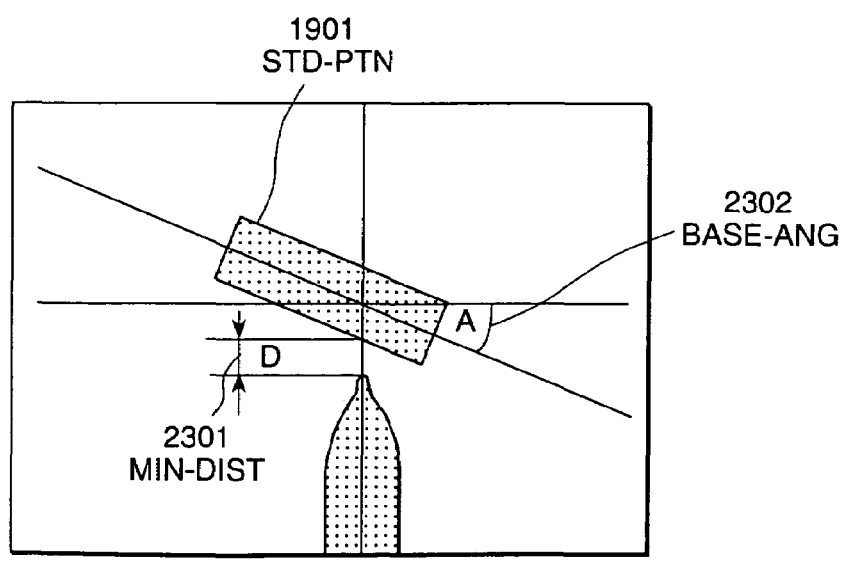
FIG. 24 is a diagram for illustrating the use of pointing correction data.

The user preference, when the user points to the object, is stored in the pointing correction buffer 2112. The content of the pointing correction buffer 2112 is a set of values as shown in FIG. 23, namely values of the object minimum distance 2301 and a standard tilt 2302. The object minimum distance 2301 is derived with reference to how much distance is provided between the penpoint 401 and the object when the user points to the standard pattern 1901. The object minimum distance 2301 can be set as a length (number of dots) of a line segment D, as seen in FIG. 24, for example. Also, the reference tilt 2302 is a value expressing how much the user tilts the video pen 103 and can represent the magnitude of the tilt A in FIG. 24, for example. An initial value of th6 object minimum distance 2301 is 20, for example, and the initial value of the standard tilt 2302 is 0, for example. In case of FIG. 24, the object minimum distance 2301 is 18 dots and the standard tilt 2302 is 32°.

A process in which the object extracting portion 2104 extracts the object from the binary image will be discussed with reference to FIG. 25. It should be noted that, in the following discussion, the coordinate system on the image has its origin at the upper left position. On the other hand, the constants used in the following discussion are CAMX representing the X coordinate of the penpoint 401 in the image, CAMY representing the Y coordinate, and D representing the object minimum distance 2301. Since the positional relationship between the penholder 201 and the camera 101 is known, CAMX and CAMY are values derived preliminarily. D is a value which can be read out from the pointing correction buffer 2112, as set forth above.

At first, the object extracting portion 2104 searches the image of the object from a point S (CAMX, CAMY-D), which is offset upwardly by the magnitude D from the coordinate (CAMX, CAMY) of the penpoint 401. Namely, the image of the object is searched along the line segment L in FIG. 25. At this stage, if any pixel considered as belonging in the object cannot be found, extraction of the object fails. Here, each pixel of the object is stored as the object region.

Next, the object extracting portion 2104 checks around the object region and takes in the pixel within a predetermined distance from the object region in a new object region. The predetermined distance is 10 dots, for example. Associated with this process, the object region is gradually expanded. The object extracting portion 2104 terminates the expansion process at a time where no further pixel to be taken is present. At the time when the expansion process is terminated, the aggregate of the pixels stored as the object region is judged as the object pointed to by the user.

At a time when the object extracting portion 2104 completes extraction of the object, the extracted object region and the region where the penpoint 401 appears are compared. When both have an overlapping portion, judgment can be made that the user has placed the penpoint 401 so that it overlaps with the object. For example, this is the case shown in FIG. 16. Accordingly, in such a case, the pointing manner teaching image is presented to the user to teach the correct object pointing method. Also, if extraction of the object has failed continuously, the pointing manner teaching image is presented to the user to teach the correct object pointing method.

Figures 25, 26:
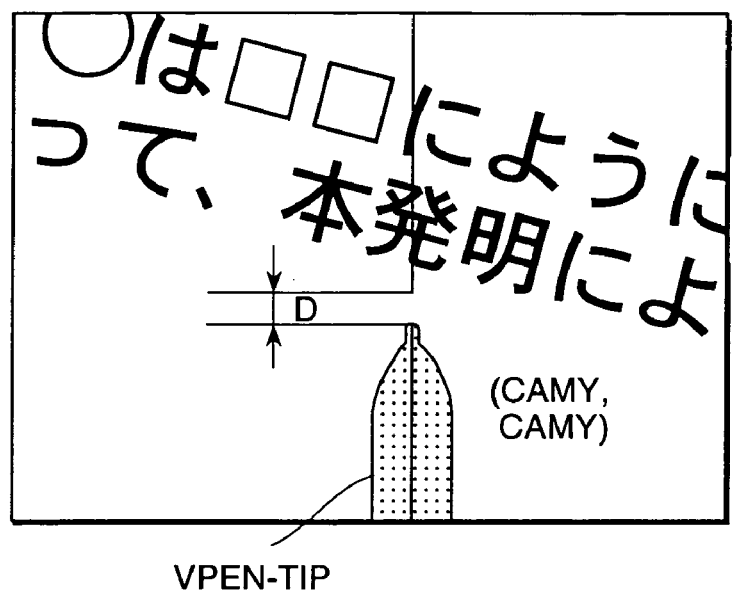
FIG. 25 is a diagram illustrating object extraction.
FIG. 26 is a diagram showing one example of an image of the extracted object.

For example, when the foregoing method is applied to the binarized image shown in FIG. 22, a pattern shown in FIG. 26 is extracted as the object. The image signal resulting from the extraction process is transferred to the tilt correcting portion 2105.

(4) Tilt Correcting Portion 2105

The tilt correcting portion 2105 is used for calculation of the tilt of the object from the image of the object transferred from the object extracting portion 2104 and the correction thereof.

Figure 27:
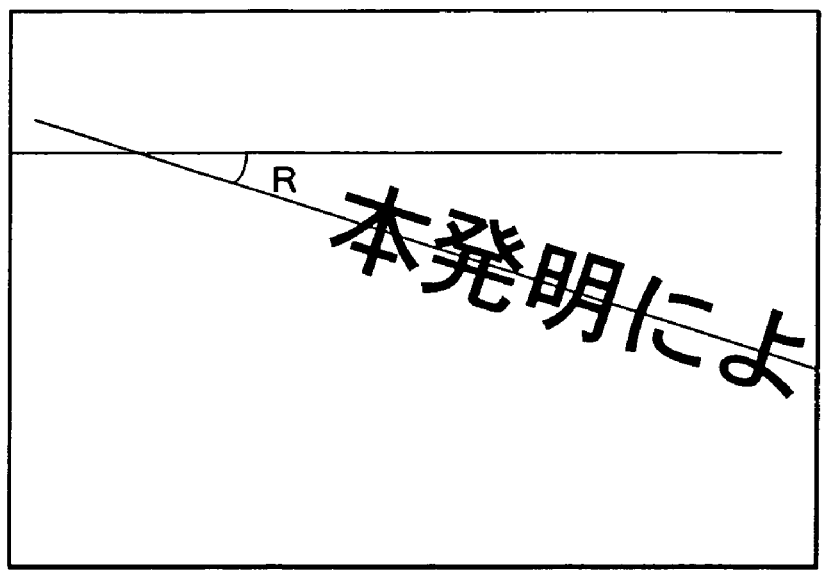
FIG. 27 is a diagram illustrating tilt correction.

At first, the tilt correcting portion 2105 calculates the tilt of the main axis of the received object. An angle R in FIG. 27 represents the tilt of the main axis. In the case of the illustrated example, the tilt is −28°. This is the tilt of the object in the image picked up by the camera 101.

Next, the tilt correcting portion 2105 calculates the tilt of the object relative to the paper on which the object is written on the basis of the tilt of the main axis, calculated as set forth above, and the value of the standard tilt in the pointing correcting buffer 2112. This tilt will be referred to as the actual tilt in the following disclosure. Particularly, the sum of the tilt of the object in the image and the value of the standard tilt becomes the actual tilt. In the illustrated embodiment, since the tilt of the object in the image is −28° and the standard tilt is 32°, the actual tilt derived therefrom is 4°.

Figure 28:
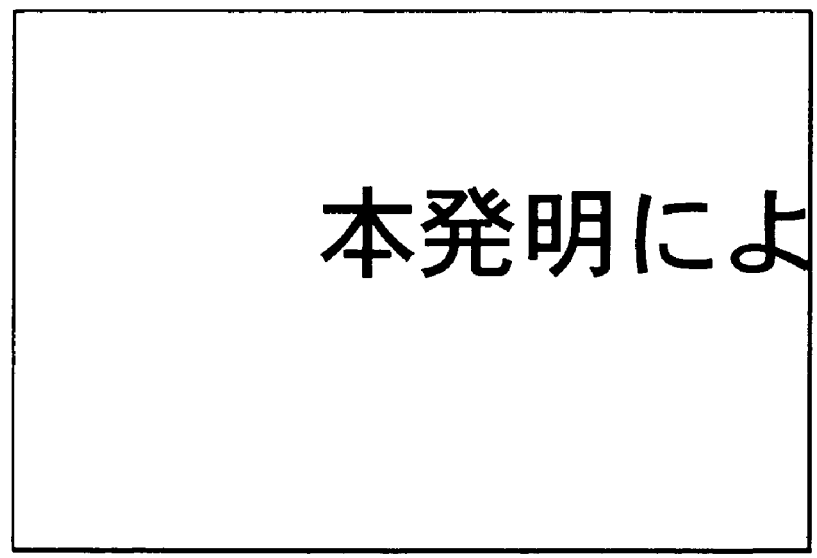
FIG. 28 is a diagram showing one example of an image of an object after tilt correction.

When the actual tilt is in a range close to 0, e.g. from −45° to 45°, the tilt correcting portion 2105 makes a judgment that the object is horizontally elongated and operates to rotate the image of the object so that the tilt of the main axis of the image becomes 0. Accordingly, in case of the example set forth above, the image is rotated over −28°. The image of the object after rotation is shown in FIG. 28. Conversely, when the actual tilt is out of the range set forth above, the tilt correcting portion 2105 makes a judgment that the object is vertically elongated, and so the image of the object is rotated so that the tilt of the main axis of the image becomes 90°.

The tilt correcting portion 2105 transfers the image of the object corrected for tilt, as completed in the foregoing process, to a characteristics extracting portion 2106. On the other hand, the image of the object corrected for tilt is stored in an object holding portion. The object holding portion holds the image, and if an already held image is present, that image is abandoned.

(5) Characteristics Extracting Portion 2106

Figure 29:
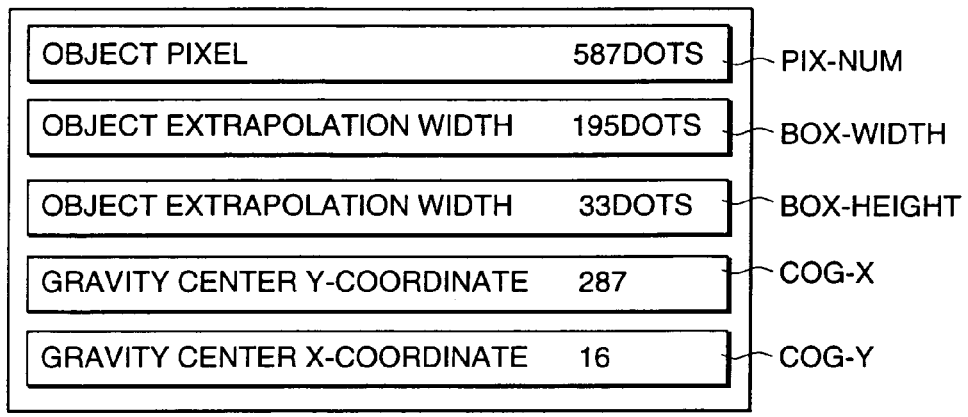
FIG. 29 is a diagram showing one example of a characteristic amount.

The characteristics extracting portion 2106 is used for extracting the characteristic amount from the image of the object fed from the tilt correcting portion 2105. The characteristic amount may be the pixel number included in the object, the size of the externally inserted rectangle, the gravity center position and so forth. These characteristic amounts are used for identifying the object later. One example of the characteristic amount is shown in FIG. 29. An object pixel number PIX-NUM, an object external insertion width BOX-WIDTH, an object external insertion height BOX-HEIGHT, a gravity center X coordinate COG-X, a gravity center Y coordinate COG-Y and so forth form the characteristic amount. These values are all integers.

The characteristic amount extracted by the characteristics extracting portion 2106 is transferred to an object recognizing portion 2107.

(6) Object Recognizing Portion 2107

The object recognizing portion 2107 is a unit used for making a judgment as to whether the object currently in process is registered or not, using the characteristic amount transferred from the characteristics extracting portion 2106.

Figure 30:
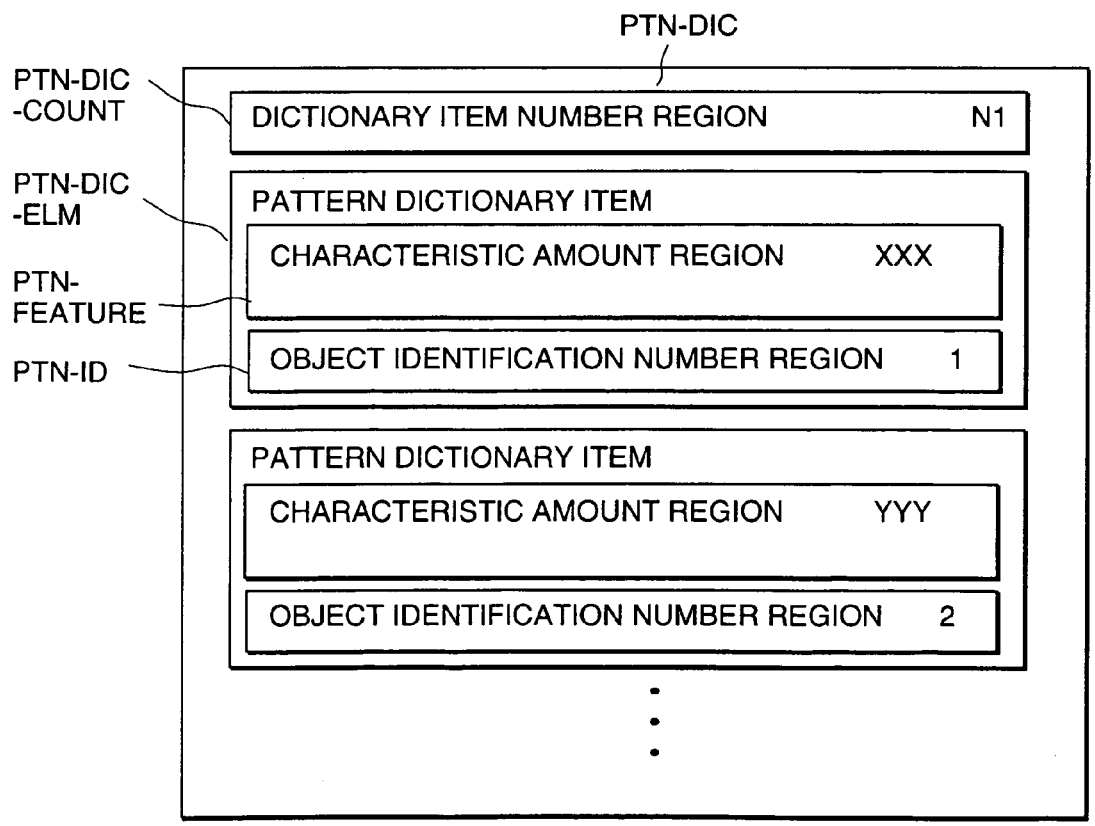
FIG. 30 is a diagram showing one example of a structure of a pattern dictionary.

The object recognizing portion 2107 compares a plurality of the characteristic amounts registered in a pattern dictionary 2113 and a characteristic amount transferred from the characteristics extracting portion 2106 to check whether a close characteristic amount is present or not. The pattern dictionary 2113 consists of a dictionary item number region holding the item number included, and a pattern dictionary item more than or equal to 0 as shown in FIG. 30. Furthermore, the pattern dictionary item consists of a characteristic amount region holding the characteristic amount and an object identification number region. In the illustrated embodiment, as the object identification number stored in the object identification number region, a natural number (1, 2, 3, . . . ) is used.

The object recognizing portion 2107 retrieves the pattern dictionary item having a characteristic amount close to the input characteristic amount and transfers the object identification number stored in the object identifying number region of the corresponding item to the operation executing portion 2108. When a registered pattern having a characteristic amount close to the input characteristic amount is not found, the object recognizing portion 2107 transfers −1 as the object identification number to the operation executing portion 2108.

(7) Operation Executing Portion

The operation executing portion 2108 is a unit for executing a predetermined process on the basis of the object identifying number transferred from the object recognizing portion 2107. The process content will be discussed hereinafter.

When the object identification number is −1, namely when the input object is hot an already registered pattern, the operation executing portion 2108 reads out the object image stored in the object holding portion so as to store it in the pattern buffer 2109. At this time, when an image already stored in the pattern buffer 2109 is present, the newly stored image is added to the right side. The object pattern accumulated in the pattern buffer 2109 is held until it is used in a later process.

On the other hand, when the object identification number is −1, namely, when the input object is not an already registered pattern, the operation executing portion 2108 reads out the pen number held in the process buffer. When the pen number is 0, nothing is done, and when the pen number is not 0, the process corresponding to the number is executed. The pen number and operation are correlated using a process table.

Figure 31:
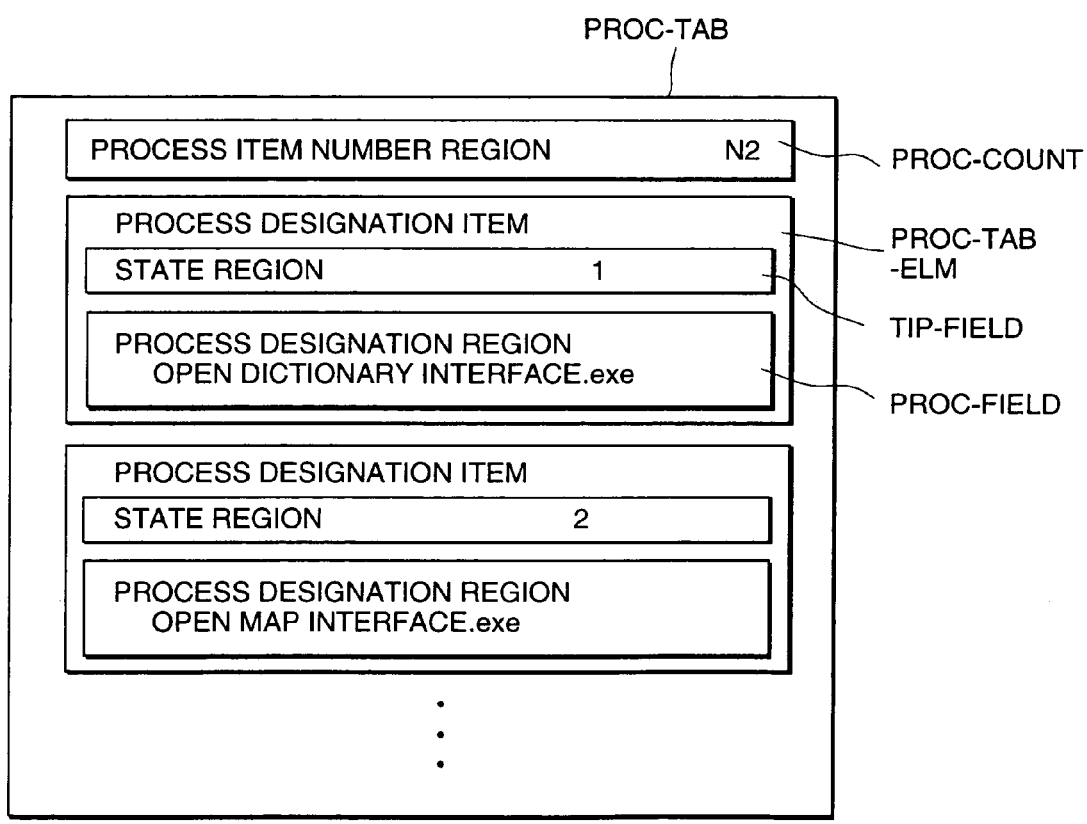
FIG. 31 is a diagram showing one example of a structure of a process table.

The process table consists of a process item number region holding the item number included therein, and greater than or equal to 0 of the process designation items, as shown in FIG. 31. The process designation item consists of the state region holding the pen number and the process designation region holding the operation to be executed when the number is set. The operation executing portion 2108 checks the process corresponding to the number using the process table, when the pen number stored in the process designation buffer is not 0.

On the other hand, when the object identification number transferred from the object recognizing portion 2107 is not −1, namely, when the input pattern is a pattern that is already registered, the operation executing portion 2108 checks which operation corresponds to the object identification number to execute the operation.

Figure 32:
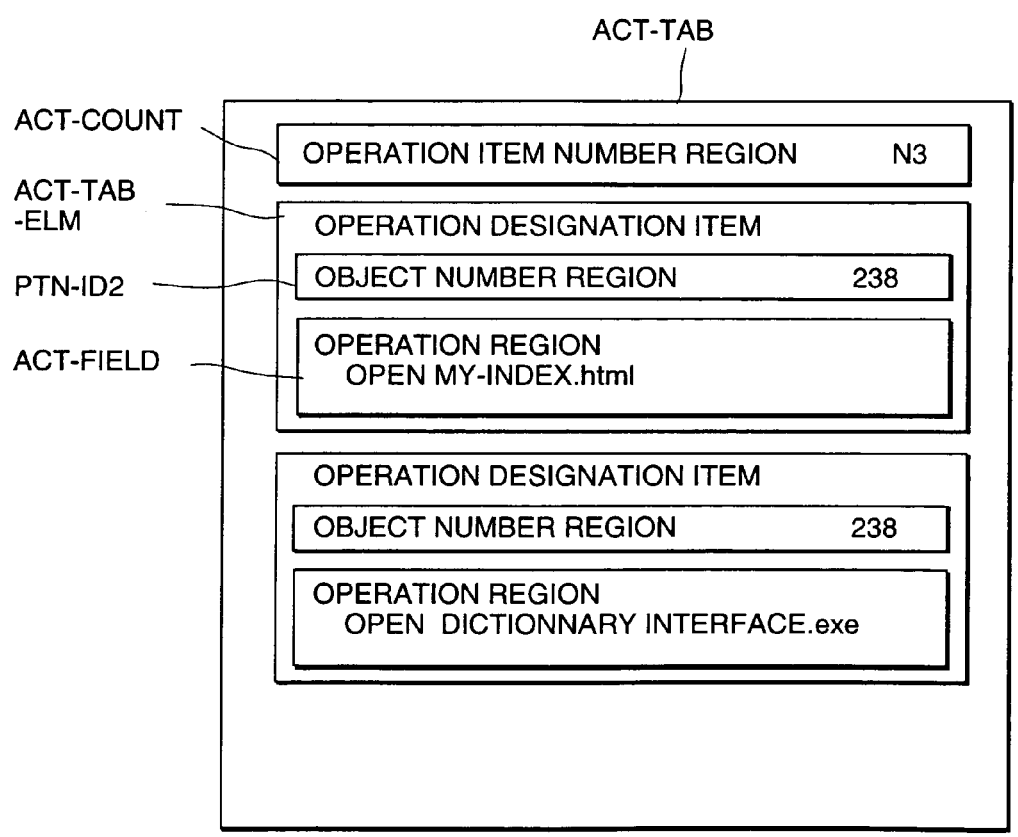
FIG. 32 is a diagram showing one example of a structure of a operation table.

The operation table (shown in FIG. 32 as ACT-TAB) consists of an operation item number region (ACT-COUNT) holding an item number included therein and more than or equal to 0 of operation designation item (ACT-TAB-ELM). The operation designation item consists of the object number region (PTN-ID2) holding the object identification number and the operation region (ACT-FIELD) holding the operation to be executed upon detection of the object.

The operation executing portion 2108 checks whether an operation designation item having a number which is the same as the object identification number given from the object recognizing portion 2107 is present in the operation table. If present, the operation region of the corresponding operation designation item is read out and executed.

The operation which the operation executing portion 2108 may execute is an OPEN operation, for example. When the operation to be executed by the operation executing portion 2108 is an OPEN operation, the operation executing portion 2108 at first stores the pattern stored in the pattern buffer 2109 in a pattern image file of a given name (e.g. "patterns.bmp"). Next, referring to a file name or a program name stored at a position following the operation name OPEN, the file is opened or the program is triggered.

The program activated by the operation executing portion 2108 operates to read the pattern image file and is used to perform arbitrary process. For example, an image stored in the pattern image file is regarded as a character string to attempt character recognition. Also, the program to be triggered by the operation executing portion may use an arbitrary function of the information processing apparatus. For example, it may be possible to call a function encyclopedia program or a function of a map program loaded in the information processing apparatus 102.

By combining the foregoing, as a program to be triggered from the operation executing portion 2108, a program to perform character recognition of the content of the pattern buffer 2109 so as to transfer it to the encyclopedia program to display its checked meaning, can be realized.

Figure 33:
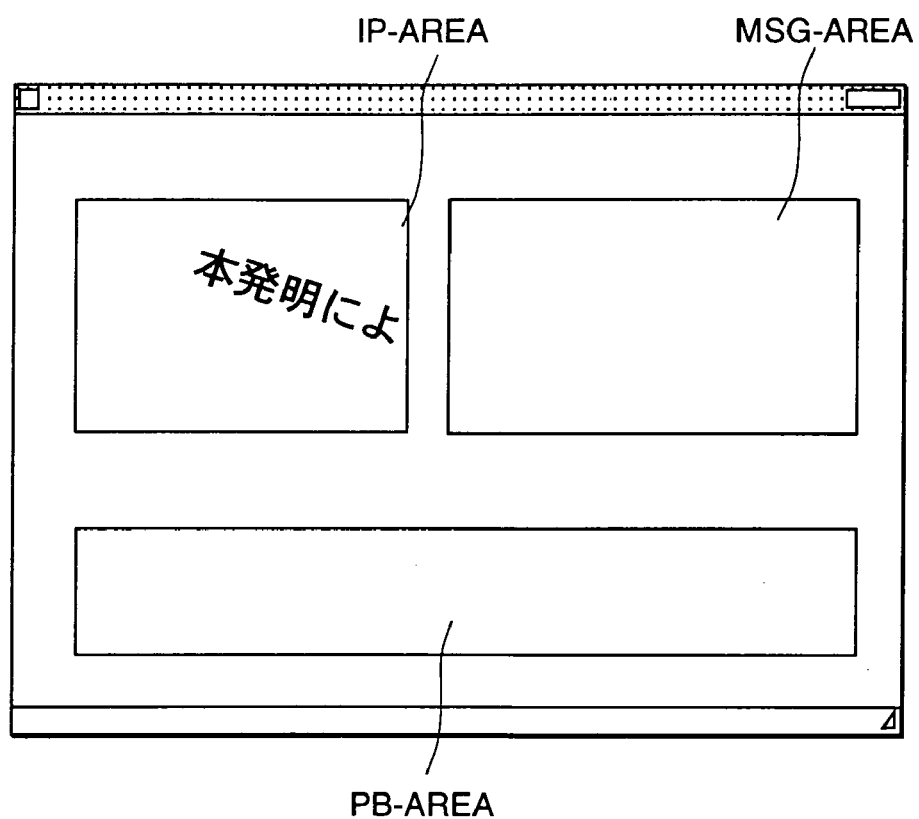
FIG. 33 is a diagram showing one example of a display image of the information processing apparatus.

FIG. 33 shows one example of a screen image displayed on the display unit 105 of the information processing apparatus for implementing the present invention. The image, which the user inputs by means of the video pen 103, is displayed in a process step displaying region. In the process step display region, the step of processing the input image may be displayed. The right side of the process step display region is a system message region. The message from the information processing apparatus to the user is displayed in this region. On the lower side of the screen, there is a pattern buffer region. In the pattern buffer region, the process object which the user pointed to using the video pen 103 and the information which the processing apparatus 102 stores temporarily are stored.

With the present invention, an object can be input by a natural operation. On the other hand, the number of operations of the user can be reduced significantly. Furthermore, it is possible to prevent repeated erroneous object pointing by the user to cause a disturbance in the imaging process.

The invention claimed is:

1. A pen type input device with a camera comprising a pen, a camera mounted on said pen to pick-up an image of a penpoint, and an information processing apparatus to perform processing of an image picked up by said camera, wherein said information processing apparatus makes judgment of an orientation of an objective image picked up by said camera depending upon a position of a tip end of said pen in the image picked-up by said camera.

2. A pen type input device with a camera comprising a pen, a camera mounted on said pen to pick-up an image of a penpoint, and an information processing apparatus to perform processing of an image picked up by said camera, wherein said information processing apparatus extracts an object to be processed from an image picked up by said camera, determines a process to be executed on a basis of a color of the penpoint detected from the picked-up image, and performs process of said extracted object.

3. A pen type input device with a camera comprising a pen, a camera mounted on said pen to pick-up an image of a penpoint, and an information processing apparatus to perform processing of an image picked up by said camera, wherein said information processing apparatus detects a position of said object extracted from the image picked up by said camera and said penpoint to display an image indicating pointing of the pen on the basis of the result of detection.

4. A pen type input device with a camera as set forth in claim 3, wherein said information processing apparatus displays an image indicating pointing of the pen when images in which said extracted object and said penpoint overlap for a time greater than or equal to a predetermined time.

5. A pen type input device with a camera comprising a pen, a camera mounted on said pen to pick-up an image of a penpoint, and an information processing apparatus to perform processing of an image picked up by said camera, wherein said information processing apparatus uses an image of a standard pattern as picked-up by user pointing, to extract positioning correction values to be used to correct image pick-up during use for subsequent image pickup.

* * * * *